United States Patent [19]
Franke et al.

[11] 3,883,642
[45] May 13, 1975

[54] PRODUCING CONCENTRATED HYDROFLUORIC ACID SUBSTANTIALLY FREE FROM IMPURITIES USING POLYETHER AND POLYOL ABSORBENTS AND NITROGEN FLUSHING GAS

[75] Inventors: Bruno Franke; Erich Hallbauer, both of Castrop-Rauxel; Wolfgang Laue, Waltrop, all of Germany

[73] Assignee: BUSS Aktiengesellschaft, Basel, Switzerland

[22] Filed: June 5, 1973

[21] Appl. No.: 367,102

Related U.S. Application Data

[63] Continuation of Ser. No. 248,940, May 1, 1972, abandoned, which is a continuation-in-part of Ser. No. 805,757, March 10, 1969, abandoned.

[30] Foreign Application Priority Data
Mar. 9, 1968 Germany.............................. 1667537

[52] U.S. Cl. ................ 423/483; 423/484; 423/488; 55/71; 203/49
[51] Int. Cl.............................................. C01b 7/22
[58] Field of Search .......... 203/49; 55/71; 423/240, 423/341, 472, 484, 488, 483

[56] References Cited
UNITED STATES PATENTS
2,520,947  9/1950  Matuszak........................... 423/341
3,013,953  12/1961  Frazer.................................. 203/49

FOREIGN PATENTS OR APPLICATIONS
633,298  10/1963  Belgium.............................. 423/240

*Primary Examiner*—A. Louis Monacell
*Assistant Examiner*—S. J. Emery

[57] ABSTRACT

A dilute or impure hydrofluoric acid in the form of a gaseous or liquid mixture is treated with an at least partially selectively absorptive organic solvent, and the solvent with the solutes is passed in countercurrent relation in a stripping column with an inert gas which drives off the impurities and the water, after which the purified acid is separated from the solvent, chosen to have preferred selectivity for HF over the impurities and water, the inert gas also suppressing polymeric reactions in the organic solvent for which the latent tendency to be catalyzed by HF or impurities is more pronounced during stripping.

8 Claims, 1 Drawing Figure

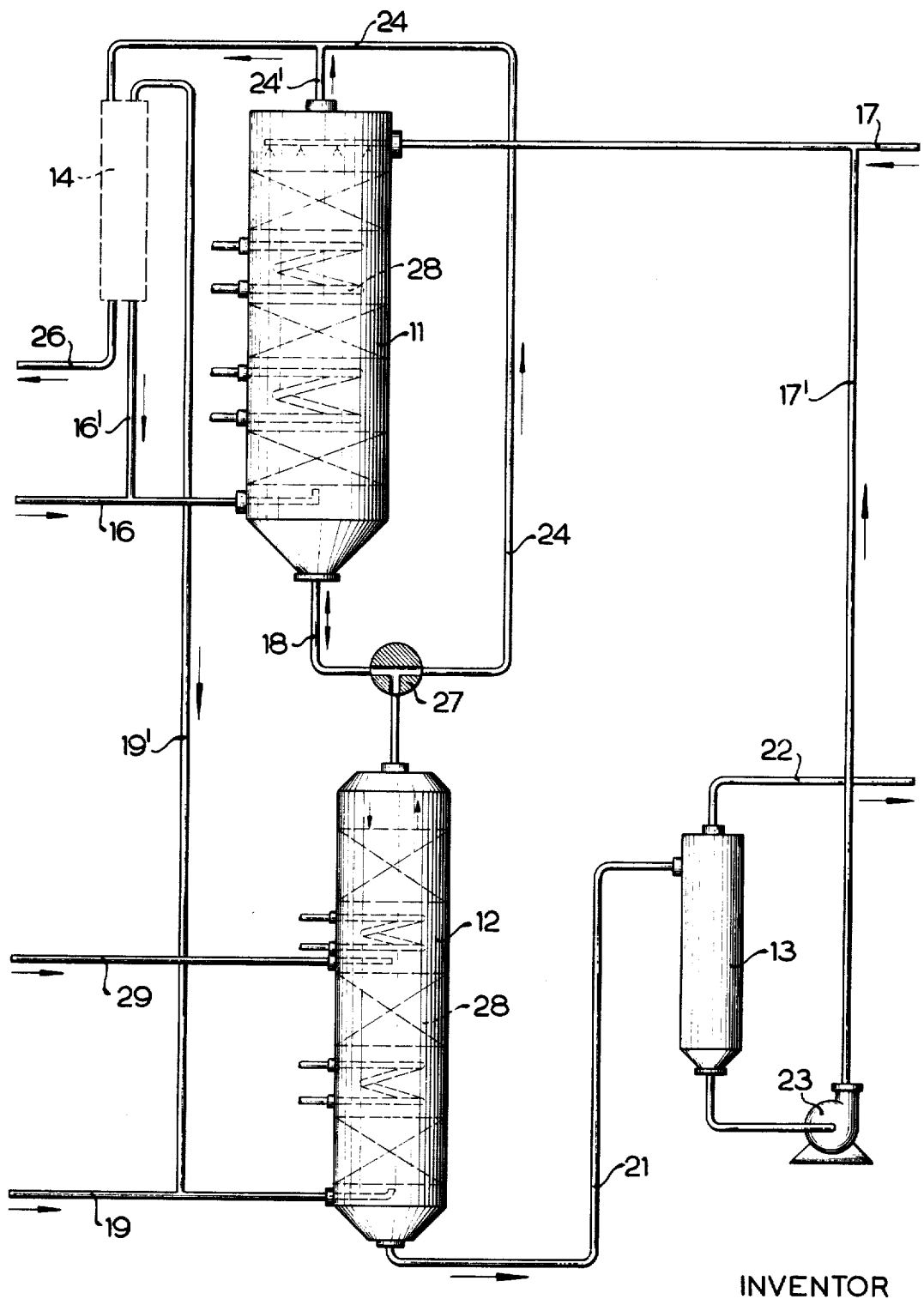

PRODUCING CONCENTRATED HYDROFLUORIC ACID SUBSTANTIALLY FREE FROM IMPURITIES USING POLYETHER AND POLYOL ABSORBENTS AND NITROGEN FLUSHING GAS

RELATED APPLICATIONS

This is a continuation of application Ser. No. 248,940 filed May 1, 1972, now abandoned; which is a continuation-in-part of application Ser. No. 805,757, filed Mar. 10, 1969, now abandoned.

BACKGROUND OF THE INVENTION

1. Field of the Invention

The invention relates to the production of concentrated, substantially impurity-free hydrofluoric acid. The process uses physical absorption without chemical reaction, in which the process forces are the solubility and equilibrium partial-pressure relationships and the resistances are principally the diffusion rates, made complex by multiple component mixtures.

2. The Prior Art

Procedures are known for producing concentrated hydrofluoric acids relatively free from impurities from gaseous or liquid dilute and/or impure mixture, in which the solution or mixture is treated with an at least partially selectively absorbent inorganic or organic solvent, after which the solvent with the solutes which it has taken up is subjected to a treatment for the substantial removal of the impurities and the acid is then separated from the solvent. A number of processes have been known or suggested for the purification and/or the concentration of dilute, and in many cases impure, hydrofluoric acid, whether for the purpose of producing the acid or refining it, in which the solution or mixture containing the acid is treated with an absorptive organic solvent which absorbs the solution or the mixture; the solvent with the solutes which it has taken up is then subjected to a flushing with gas or vapor for the removal of the impurities; and the purified solvent is then separated from the solutes, after which if necessary a final concentration of the acid follows. The acid mixture to be purified or concentrated can be of liquid or gaseous consistency. The various handling stages, especially the absorptive procedure and the following purifying procedure, can go on at the same time.

It is advantageous to use solvents which have a selective absorptive power. Suitable absorbents are polyether and polyols. But most solvents possess also the capacity for taking up other materials, either those in the starting mixture or the starting solution or those contained in the medium with which the solvent with the solutes which it has taken up for the purpose of cleaning and/or for the purpose of subsequent separation of the partially purified solutes from the solvent is treated. For the purpose of thorough purification, it is in all cases necessary to recirculate the part of the resulting solvent with solutes in more or less pure form, which results in a decrease in the yield.

For the recovery and purification, with or without concentration, two distinct groups are known to be used for absorption from vapors or solvent extraction from liquid mixtures. One group uses absorption with chemical reaction between the solvent and solutes and the other group of processes makes use only of the so-called physical absorption, such as step one of the process disclosed in the Belgian Pat. No. 633,298 on page 2, lines 19 to 31. The finally resulting acid thereby always has a low degree of purification and a relatively low concentration, because substantial quantities of impurities and water remain carried by the solvent and are carried along with it. Thus in this case always an acid concentration in the range of 50–60 per cent is achieved, even if the quantity of solute in the solvent has been strengthened by feeding back an azeotropic acid mixture from a later process stage. This is illustrated on the attached chart 1 in column A,I.

If air is present or added during the acid process - and this is true even in small traces - undesired corrosion phenomena result in the apparatus in which the process is carried out. The presence of oxygen also in many cases can lead to a polymerization or a cracking of the organic solvent. This is basically a minor problem, where the acid has served as a catalyst in organochemical reactions, and is then to be extracted with solvent from a process effluent. Catalytic reaction with solvent is then often process compatible as in acid catalyzed alkylation of petrocarbons where fresh solvent for makeup is liberally available. But the problem of how to prevent catalytic reaction becomes serious where the same solvent must be used without loss in closed circuit for long times, for economic reasons. Catalytic reactions between acids and organic chemicals are always latent, especially with hydrofluoric acid and inorganic fluorine compounds. The tendency to such reaction is pronounced during the mass transfer occuring on physical absorption and stripping, illustrated also by example A on the attached chart 2.

SUMMARY OF THE INVENTION

The present invention is basically a substantially improvement of step one of the aforementioned Belgian Patent No. 633,298 and provides a process for producing high concentrations of hydrofluoric acid substantially free of impurities from gaseous or liquid dilute and/or impure acid-containing mixtures, in which the solution or mixture is treated with an at least partially selectively absorptive organic solvent, the solvent with the solute which it holds is subjected to treatment for the most complete removal of impurities, and the acid is then separated from the solvent, the invention being characterised by the fact that the solvent with the solutes which it holds is flushed in a stripping column in counter current with an inert gas to remove the impurities and the water, and acid is then in the known way separated from the solvent.

With the use of an inert gas, it has been found that, in an unexpected and advantageous way, the disadvantages connected with the known purification or concentration procedures are avoided. Because both the impurities and the water are removed almost completely by the inert gas, it is unnecessary to use a further concentration of the acid.

Advantageously the inert gas is also added in the absorption column. It has been found that in this way the selectivity in the taking up of acid through the solvent in contrast to impurities and water is improved in this manner. For this purpose the flushing gas laden with impurities issuing from the stripping column, which besides carries with it some acid, can simply be led partly or completely into the absorption column. Through this expedient also the loss of acid through carrying off of acid in the inert gas is completely or partially avoided, and the yield is thus improved.

For the progress of the process, especially for the separation of water, a minimum temperature higher than the vaporizing temperature of the water is necessary. The upper limit of the temperature depends upon the temperature resistance of the organic solvent serving as the solvent medium and/or the boiling point of the acid mixture. For the progress of the process a temperature gradient, in a direction counter to the liquid phase, has been found advantageous. The desired temperature levels can be controlled through heating and/or cooling arrangements in the column. The introduction of preheated gas may also be advantageous.

For technical reasons and reasons of efficiency, the solvent after separation of the purified acid is led back again to the absorption column. It is especially to be noted that the efficiency of the solvent with the use of inert gas as the flushing gas remains practically undiminished. In a like manner, the inert gas can be recovered and returned to the process.

A particular case in which the procedure according to the invention has been particularly advantageous is the recovery of concentrated hydrofluoric acid substantially free of $SiF_4$ from solutions of $H_2SiF_6$, as well as from gaseous or liquid mixtures containing, for example, HF, $SiF_4$ and/or $H_2SiF_6$, in which the solution or mixture is treated with a solvent comprising an aliphatic polyether or polyol, the solvent with the solutes carried by it is subjected to a treatment for the highest possible stripping of $SiF_4$, and the hydrofluoric acid is then separated from the solvent, in which the solvent with the solutes which it carries is flushed in a stripping column in counter-current with an inert gas which removes the $SiF_4$ and the water, and the hydrofluoric acid is then separated in a known way from the solvent. In this way it is possible to achieve a hydrofluoric acid concentration which cannot be obtained with known procedures, in addition to which the corrosion which accompanies the addition of oxygen to the hydrofluoric acid is avoided.

Especially in connection with such recovery of hydrofluoric acid, polyglycol as the solvent and nitrogen as the flushing gas have been proven satisfactory, but carbon dioxide can also be used as the flushing gas. Suitable working temperatures can be gained by having a temperature gradient of about 45°C from the foot to the stripping column to the head of the absorption column, which heats in counter-current to the liquid phase so that the lowest head temperature is at least 100°C. Preferably the range is 145°C to 135°C in the stripping column and 135°C to 100°C in the absorption column.

In the recovery of hydrofluoric acid from $H_2SiF_6$ solutions as well as gaseous or liquid mixtures containing HF, $SiF_4$ and/or $H_2SiF_6$, the $SiF_4$ and the water driven off from the inert gas as well as the entrained hydrofluoric acid can be worked up and the $H_2SiF_6$ recovered or formed by hydrolysis can be recirculated to the absorption column so that an approximately 100 per cent yield results.

BRIEF DESCRIPTION OF THE DRAWING

The drawing shows an apparatus for carrying out the invention.

DESCRIPTION OF THE PREFERRED EMBODIMENTS

The apparatus used in general consists of an absorption column 11, a stripping column 12, a separating device 13 and possibly a refining separator 14.

The solution to be purified is introduced in superheated condition through the pipe 16 into the lowest part of the absorption column 11 and flows in counter-current to the solvent which is introduced through the pipe 17 into the upper part of the absorption column 11. Solutes of the components of the mixture form in the solvent, with preference for the acid to be recovered.

The solvent with the solutes carried by it passes out at the bottom of the absorption column 11 and flows through the connecting pipe 18 to the head of stripping column 12, in which it flows in counter-current to the preheated inert gas introduced into the bottom part of the column by pipe 19. The inert gas selectively strips out the impurities and the water from the solvent and, mixed with the impurities and the water, passes out through the head of the stripping column 12.

The solvent which is now laden only with acid passes out at the bottom of the stripping column 12 and travels through the connection pipe 21 to the separator apparatus 13, in which the acid in the known way is separated from the solvent. The separated acid travels from the top of the separating device 13 and goes through the pipe 22 to a filling station (not shown). The solvent going out from the bottom of the separating arrangement 13 is pumped back through the pipe 17' into the absorption column 11.

The inert gas passing out of the stripping column 12, mixed with the impurities in the water, is led back wholly through the connecting pipe 18 to the absorption column 11, or merely in part to the extent that the promoting effect of the inert gas on the selective action of the solvent on the solutes is to be used, and the excess or even the whole of the inert gas mixed with impurities in the water is led off through the pipe 24 to the refining separator 14, or is discharged. The portion of the inert gas which is fed through the absorption column 11 leaves the absorption column at the top and travels together with the unabsorbed constituent of the outgoing mixture through the connecting pipe 24' to the pipe 24.

In the refining separator 14 a recovery of the inert gas can take place, which is then led back through the pipe 19',19 into the separating column 12, accompanied by a recovery of acid carried along with it or refinement of the impurities in the acid, which then is led back through the pipe 16',16 into the absorption column 11.

The supply of the aborption column 11 with inert gas is controllable by way of a three-way valve 27 in the connecting pipe 18.

The temperatures in the absorption column 12 are controllable by means of heating or cooling elements 28 arranged in the columns.

Through the pipe 29 azeotropic acid if available may be introduced into the stripping column 12.

The described arrangement may be used for the production of pure, concentration hydrofluoric acid from a dilute $H_2SiF_6$ solution which as is known presents especially difficult technical problems. Attached chart 1 represents results from this chosen example, which for demonstration was run without flushing gas as shown in the result-columns under A and with flushing gas in the result-columns under B. Further variations of the tests were run with an azeotropic hydrofluoric acid mixture additionally introduced into the stripping column, available as the by-products in the rectification of highly concentrated hydrofluoric acid. Tests run with azeotrope addition are shown in the result-columns under subheadings A I and B I, tests run without azeotrope under A II and B II. A polymeric glycol, i.e. polyglycol was used as a solvent with a mean molecular weight of 400. Nitrogen was used as the flushing gas. In the portion of the apparatus composed of the absorption and stripping columns, a temperature range of 105°– 133°C was maintained in counter-current to the liquid phase. The absorption column and the stripping column can of course be built as a single unit. There would be provided in the upper part of the apparatus a tapping point for the removal of a part of the flushing gas. In the tests represented by Chart 1, result-columns under B were obtained with the process of the invention and clearly show the substantial improvement obtainable over the present art represented by results under A, columns B I indicate the highest final purity for X : Y, that is, the ratio of HF to $SiF_4$ in the output of the stripping column.

In Chart 1, columns A–I–1, A–I–2 and A–I–3 show tests carried out without a flushing gas and with introduction of an azeotropic hydrofluoric acid; columns A–II–1 and A–II–2 show similar tests without introduction of the azeotrope; columns B–I–1, B–I–2 and B–I–3 show tests with introduction of an azeotrope using nitrogen as a flushing gas; and columns B–II–1 and B–II–2 show similar tests without an azeotrope.

Chart 2 concerns information on tests carried out for a longer period, in order to permit conclusions on the stability of the solvent when an inert gas is used as a flushing gas to be drawn. In this chart, A designates tests without flushing, while B shows tests with oxygen-free nitrogen used as a flushing gas.

In Chart 1, special reference is made to the X snd Y values, which show that the highest hydrofluoric acid concentration with the lowest $SiF_4$ concentration is reached if nitrogen is used as the flushing gas. As the corresponding values under II show, in this way also a concentration of azeotropic hydrofluoric acid can be obtained without increasing the water content in the solvent laden with acid. In Chart 2, it is to be noted that when using nitrogen as flushing gas the solvent also retains its full absorptive capacity over long periods of time.

Polyethers are organic compounds, which contain OH groups as well as O-bridge atoms (so-called ether oxygen). Their general formula is $$R_1 - O - (R_2 - O)_m - R_3,$$

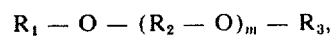

wherein $R_1$, $R_2$ and $R_3$ are aliphatic groups with 1 – 6 C-atoms; these groups can be chain-like or branched; groups $R_1$ and $R_3$ must, and group $R_2$ may, contain at least one OH-group; $m$ is a whole number greater than or equal to 1. Examples are polyethyleneglycol; polypropyleneglycol and polybutyleneglycol.

Polyols are alcohols with more than one OH-group. Their general formula is $$C_nH_{(2n - m + a)} (OH)_m,$$

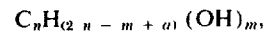

wherein $n$ is equal to or greater than 2, $m$ is equal to or greater than 2, $a$ is a whole number greater than or equal to 1, or zero or a multiple of $-2$. Examples of polyols are glycerine, sorbite, the different pentanedioles and their mixtures as well as the hexanetriols or their mixtures.

CHART 1

| | | | A | | | | | B | | | | |
|---|---|---|---|---|---|---|---|---|---|---|---|---|
| | | | I | | | II | | I | | | II | |
| | | | 1 | 2 | 3 | 1 | 2 | 1 | 2 | 3 | 1 | 2 |
| a) Charge to the Absorption Column 11 | | | | | | | | | | | | |
| $H_2SiF_6$ Solution | HF | | 0.66 | 0.54 | 0.50 | 0.54 | 1.02 | 0.57 | 0.54 | 0.54 | 0.55 | 1. |
| | $SiF_4$ | | 0.33 | 0.27 | 0.25 | 0.27 | 0.51 | 0.28 | 0.27 | 0.27 | 0.27 | 0.51 |
| | $H_2O$ | | 9.27 | 7.53 | 7.23 | 7.78 | 7.84 | 7.97 | 7.64 | 7.75 | 7.75 | 7.94 |
| Absorbent (Polyglycol) | | | 1.00 | 0.72 | 0.55 | 0.58 | 0.57 | 0.59 | 0.57 | 0.57 | 0.53 | 0.57 |
| Flushing Gas to Column 11 | | | none | none | none | none | none | some | some | some | some | some |
| b) Charge to the Stripping Column 12 | | No. of Moles | | | | | | | | | | |
| Azeotropic hydrofluoric acid | HF | | 0.98 | 0.97 | 0.90 | | | 0.86 | 0.87 | 0.90 | | |
| | $H_2O$ | | 1.76 | 1.73 | 1.57 | | | 1.56 | 1.57 | 1.62 | | |
| Flushing Gas (Nitrogen) | | | none | none | none | none | none | 0.89 | 0.67 | 0.67 | 0.45 | 0.45 |
| c) Output from the Stripping Column 12 | | | | | | | | | | | | |
| | HF | | 1.57 | 1.45 | 1.38 | 0.52 | 0.89 | 1.39 | 1.39 | 1.33 | 0.522 | 0.98 |
| | $SiF_4$ | | 0.018 | 0.014 | 0.006 | 0.007 | 0.009 | 0.0005 | 0.001 | 0.0005 | 0.0009 | 0.0012 |
| | $H_2O$ | | 1.43 | 1.32 | 0.93 | 0.05 | 0.42 | 0.11 | 0.14 | 0.11 | 0.03 | 0.05 |
| Polyglycol | | | 1.00 | 0.72 | 0.55 | 0.53 | 0.57 | 0.59 | 0.57 | 0.57 | 0.56 | 0.57 |
| X HF | | Wt. | 53.4 | 53.50 | 61.3 | 87.0 | 67.8 | 93.5 | 91.2 | 93.2 | 94.3 | 94.8 |
| Y $SiF_4$ | | % | 3.10 | 2.71 | 1.54 | 5.82 | 3.45 | 0.17 | 0.43 | 0.17 | 0.82 | 0.74 |

CHART 2

| Test Time | | Hours | 0 | 242 | 408 | 690 |
|---|---|---|---|---|---|---|
| Saponification Number | A | mg-KOH/g | 0.0 | 16.5 | 19.5 | 30.7 |
| | B | | 0.0 | 0.0 | 0.0 | 0.0 |
| Viscosity | A | cSt | 66.0 | 67.0 | 71.5 | 76.0 |
| | B | | 66.0 | 66.0 | 66.0 | 66.0 |
| Molecular Weight | A | | 405 | 421 | 444 | 473 |
| | B | | 405 | 412 | 408 | 414 |

A - no flushing gas
B - nitrogen as flushing gas

We claim:

1. A process for producing concentrated hydrofluoric acid substantially free of $SiF_4$ from a fluid material selected from the group consisting of (1) solutions of fluorine compounds including $H_2SiF_6$ and (2) gaseous mixtures containing HF, $SiF_4$ and $H_2O$, which comprises treating the fluid as a solute in an absorption column at a temperature of at least 100°C with a solvent comprising a selectively absorbent organic selected from the group of aliphatic polyethers and polyols, flushing the solvent carrying the solutes with oxygen-free nitrogen countercurrent to the solvent in a stripping column separate from the absorption column at a temperature of at least 100°C, the nitrogen thereby taking off $SiF_4$ and $H_2O$, removing (1) the nitrogen loaded with $SiF_4$ and $H_2O$ and (2) the solvent separately from the stripping column and thereafter separating the hydrofluoric acid from the solvent.

2. The process according to claim 1, which includes introducing a part of the inert gas leaving the stripping column and mixed with $H_2O$ and $SiF_4$ into the absorbing column.

3. The process according to claim 1, which includes recovering HF carried along with the inert gas as well as the $H_2O$ and $SiF_4$ by forming $H_2SiF_6$ therefrom and recycling the $H_2SiF_6$ into the absorption column.

4. The process according to claim 1, which comprises feeding recovered azeotropic hydrofluoric acid into the stripping column.

5. The process according to claim 1, which comprises maintaining across the stripping and absorption columns a temperature gradient increasing in a direction opposite the direction of flow of the fluid.

6. A process as claimed in claim 1, in which said aliphatic polyethers are compounds having the formula $$R_1 - O - (R_2 - O)_m - R_3,$$

wherein $R_1$, $R_2$ and $R_3$ are aliphatic groups with 1 - 6 C-atoms; the aliphatic groups are chain-like or branched; groups $R_1$ and $R_3$ must, and group $R_2$ may, contain at least one OH-group; and m is a whole number greater than or equal to 1.

7. A process as claimed in claim 7, in which the polyols are alcohols of the formula $$C_nH_{(2n - m + a)}(OH)_m,$$

wherein $n$ is equal to or greater than 2, $m$ is equal to or greater than 2, $a$ is a whole number greater than or equal to 1, zero or a multiple of −2.

8. A process as claimed in claim 1, in which the polyols are alcohols of the formula $$C_nH_{(2n - m + a)}(OH)_m,$$

wherein $n$ is equal to or greater than 2, $m$ is equal to or greater than 2, a is a whole number greater then or equal to 1, zero or a multiple of −2.

* * * * *